United States Patent Office 3,422,004
Patented Jan. 14, 1969

3,422,004
MOLECULAR SIEVE REGENERATION METHOD
Frank G. Padrta, Bellwood, Ill., assignor to Universal Oil Products Company, Des Plaines, Ill., a corporation of Delaware
No Drawing. Filed Apr. 19, 1965, Ser. No. 449,331
U.S. Cl. 208—310                    11 Claims
Int. Cl. C10g 25/00; C07c 9/14

ABSTRACT OF THE DISCLOSURE

Regeneration of deactivated molecular sieve sorbents by treatment with liquid water to remove high molecular weight polar contaminants.

---

This invention relates to a method for regenerating the activity of molecular sieve sorbents in order to restore the sorbent to an active condition for sorption of straight chain compounds. More specifically this invention concerns a method for reactivating molecular sieve sorbents which have become deactivated by accumulation of contaminating substances on the porous structure of the sorbent by a process which comprises contacting the deactivated molecular sieves with water at a temperature and pressure to maintain the water in the liquid phase and continuing the contacting process until the sieves are substantially reactivated.

Several sorption-type processes utilizing specific sorbents are known for the separation of compounds on the basis of their molecular structure and/or chemical composition utilizing an inorganic sorbent containing pores in which one or more of the components of the mixture belonging to a particular class of materials is selectively sorbed and retained in the pores of the sorbent but in which one or more components belonging to another class of substances are rejected by the sorbent. The sorbents having such selective sorbency are generally of the inorganic type such as certain specially active carbons, prepared for example by carbonization of acid sludges, specially activated alumina, and a class of zeolite-type sorbents comprising certain metal alumino-silicates, particularly the dehydrated zeolitic alkali metal and alkaline earth metal alumino-silicate which upon dehydration contain pore entrances of less than about 6 Angstrom units in cross sectional diameter and which have a high sorbent capacity for polar molecules and straight chain compounds but which reject branched chain and cyclic compounds because the cross sectional diameters of the pore entrances do not permit entry of compounds having larger molecular diameters than the straight chain compounds. A specific sorbent of this latter type is the calcium alumino-silicate Type A molecular sieve. In all of these processes, however, the sorbent gradually becomes deactivated during use while the feed stock is on stream in the separation process as a result of the sorption of polar compounds which contaminate the feed stock or the sorption of higher molecular weight compounds which are retained by the sorbent with greater tenacity than the selectively sorbed component of the feed stock. Thus when using calcium alumino-silicate having pore entrance diameters of about 5 Angstrom units for the separation of straight chain hydrocarbons from their branched chain isomers and cyclic analogs, after a period of use the rate and capacity of the sorbent to sorb the straight chain components tends to decrease. Examination of the deactivated molecular sieve indicates that polar compounds and especially those of high molecular weight are responsible for the deactivation. These compounds comprise nitrogen, oxygen and sulfur containing aliphatic, polynuclear and heterocyclic compounds which, because of their electrophilic nature tend to be retained by the sorbent with greater tenacity than the straight chain components of the feed stock. Other polar compounds include the high molecular weight polycyclic aromatic hydrocarbons.

The pore structure of a molecular sieve is composed of a series of interlaced cavities connected by still small pore entrances. The pore entrances are of uniform size and are responsible for the separation on the basis of molecular size. There are a number of pore entrances on the surface of the sieve and when the polar contaminants adsorb at or near the pore entrance, said compounds can effectively block off the passage of straight chain compounds through the pore entrance. Accordingly, even though there is adequate volume in the internal cavities to sorb straight chain compounds, nevertheless, the rate of sorption into the cavities becomes so slow as to render the sieve incapable of practically separating the straight chain component. It is also evident that even a small quantity of polar contaminants can effectively deactivate molecular sieves by strategically locating at the surface pore entrances. Although the concentration of these polar contaminants in the feed stock may be reduced by pretreating steps such as hydrorefining, guard chambers of adsorbent etc. invariably a small quantity will reach the sorption zone, accumulate on the sieves and eventually deactivate the sieve. Although the sieves may be regenerated by burning the contaminants off in the presence of oxygen, this may involve unloading the sieves from the sorption chamber in a commercial contacting zone because of the required high temperatures. Also, such burning procedure tends to crack and carbonize the sieves and the residue within the pores tends to resinify or undergo various condensation reactions which plug the pores and permanently damage the sieves. In the case of a sorption process such as that claimed in U.S. Patent No. 2,985,589 unloading the sieves from the contacting chamber is a costly and slow operation. It is preferable to regenerate the sieves in the contacting chamber while simultaneously restoring their initial rate and capacity to sorb straight chain hydrocarbons.

It is an object of this invention to regenerate deactivated molecular sieves.

It is another object of this invention to substantially restore the rate and improve the capacity of deactivated molecular sieves to sorb straight chain hydrocarbons from fluid hydrocarbon mixtures.

It is a more specific object of this invention to regenerate molecular sieves in a contacting chamber without having to remove them from the chamber.

It is another more specific object of this invention to displace polar compounds held on the surface of a molecular sieve with liquid water.

These and other objects will become more apparent in the light of the following detailed description.

I have found that liquid water is especially effective in removing the polar contaminants from deactivated molecular sieves thereby restoring the high rates and improving the capacity of the sieves without causing any undesirable side reactions or permanently damaging the sieves. In a typical separation process the molecular sieve sorbent is loaded into a fixed bed and the feed stock containing the straight chain components is introduced into the bed at some point. The process may contain two chambers each containing a fixed bed of sorbent, one bed on an adsorption cycle and the other bed on a desorption cycle and at some point later in time, switching the beds. This is the well known swing bed process. Another process continuously operated employs a single contacting chamber but maintains different zones within the chamber and continuously shifts the zones by moving the points at which feed stock and desorbent are introduced and raffinate and sorbate are withdrawn. This is the simulated counter-current contacting process described and claimed in U.S. Patent No. 2,985,589. Usually, in each of these processes the selectively sorbed straight chain hydrocarbon is displaced from the sieve by a desorbent straight chain hydrocarbon preferably of a sufficiently different molecular weight to render the desorbent readily separatable from the feed stock components by ordinary fractionation. A raffinate and a sorbate stream are produced from the process and said streams are separately fractionated and the desorbent from each stream is combined and returned to the desorption zone. In either process, after repeated charging of feed stock the sieves gradually deactivate even with extensive pretreatment of said feed stock. The sieves may be regenerated in the chamber by the following procedure. Liquid water is introduced into the bed of sieves to displace the hydrocarbons from the bed. The temperature of the water is controlled to maintain a maximum temperature in the bed of less than 150° C. and the pressure is selected to maintain the water in the liquid phase. Although the water may be introduced into any point in the bed, I prefer to introduce the water into the bottom of the bed and allow it to pass upflow through the bed to insure complete contacting of the water with the sieves. When water is introduced into the hydrocarbon containing bed the water will preferentially be sorbed with a resulting evolution of heat due to the heat of adsorption. Accordingly, to limit the maximum temperature attained in the bed when displacing the hydrocarbon with water, the temperature of the inlet water and the rate are controlled so that the bed is held below 150° C. As the water passes through the bed a temperature gradient due to the initial heat of adsorption will also pass through the bed. When the temperature gradient has passed through the bed, the temperature of the inlet water is increased to maintain a temperature within the bed of from about 25° C. to about 150° C. and preferably within the range from 60° C. to 150° C. The rate of introduction of water is controlled to maintain a liquid hourly space velocity of from about 0.05 to about 2.0 and preferably from about 0.2 to about 0.4. In this manner the maximum temperature limitation is maintained during both the initial and later stages of water regeneration. The water is continually passed through the bed for a period of time until the sieves are substantially restored to their initial rate. This may take from about 1 hour to several days depending on the water temperature, the polar contaminant and its concentration although in most cases 24 hours of water contact at temperatures of 95° C. will be sufficient to restore the activity of the sieve. After the water contacting step has been completed the excess water is removed from the bed and the sieves are prepared for starting the separation process over again. This is accomplished by drying the sieves to a predetermined low level by methods such as purging with a dry gas or flushing with a dry hydrocarbon fluid containing straight chain hydrocarbons.

It is thought that since water is a highly polar compound, it is more tenaciously held on the sieve than either the straight chain components or the polar compound contaminants and accordingly water is able to displace said polar contaminants from the sieve. Sieves which have been used in a process to separate normal paraffins having from 10 to 15 carbon atoms per molecule from a kerosene feed stock until the rate has decreased to the point that they are no longer practical to use in the process are contacted with liquid water at room temperature. The polar contaminants displaced from the sieves were analyzed by Mass Spectrometer, shown to be polynuclear compounds with an approximate molecular weight range of from 150 to about 700 and classified as being mostly polynuclear aromatics and some polynuclear saturates. Some of these high molecular weight compounds were found to contain nitrogen. The following additional examples are presented to further illustrate the method of the invention, but it is not intended to limit the invention to the conditions disclosed therein.

Example I

A batch of deactivated 30–50 mesh calcium Type A sieves which have been exposed to a kerosene charge stock for several months to separate out normal paraffins from their branched chain isomers and cyclic analogs are evaluated for rate and capacity by the gas evolution test. The test is performed by loading 20 grams of the sieves into a fixed bed in a vessel while purging the bed with nitrogen until the pores of the sieves contain substantially all nitrogen. The bed is thereafter contacted with 50 cc. of 2,2,4-trimethylpentane to displace all the nitrogen from the void spaces between the sieve particles. When the bed has come to equilibrium, 5 cc. of technical grade normal hexane is added to the vessel. The trimethylpentane molecules are too large in molecular cross sectional diameter to pass into the pore cavities since these molecules cannot fit through the pore entrances. However the straight chain normal hexane is sufficiently small to fit through the pore entrance and accordingly passes into the pore cavities and displaces nitrogen from said cavities. The displaced nitrogen can be collected and measured. The rate of displacement of nitrogen especially in the first few minutes after adding the normal hexane to the vessel is an indication of the rate activity of the sieve while the totally evolved nitrogen is a measure of the ultimate hydrocarbon capacity of the sieve. The total nitrogen evolved after allowing the sieve in the vessel to come to equilibrium is taken as an indication of the capacity. Two and one half minutes after adding the normal hexane to the vessel, 57 cc. of nitrogen per 100 grams of sieves at standard conditions are evolved. After allowing the mixture in the vessel to stand for 2 hours, 1056 cc. of nitrogen per 100 grams of sieves are evolved.

A sample of the same batch of deactivated sieves is placed in a vessel, and liquid water at 60° C. is introduced upflow into the vessel for a period of 12 hours. The water treated sieves are purged free of liquid water and dried in a stream of nitrogen at 350° C. Twenty cc. of the resulting sieves are recovered and evaluated in the foregoing gas evolution test. Two and one half minutes after adding the normal hexane to the vessel, 871 cc. of nitrogen per 100 grams of sieves at standad conditions are evolved. After allowing the mixture in the vessel to stand for 2 hours, 1114 cc. of nitrogen per 100 grams of sieves are evolved.

A batch of the same type of sieves that were not exposed to the hydrocarbons but are rather new fresh sieves is evaluated in said gas evolution test. The results show an evolution of 886 cc. of nitrogen per 100 grams of sieves at standard conditions after 2½ minutes and an evolution of 1397 cc. of nitrogen per 100 grams of sieves at standard conditions after 2 hours.

It should be noted that the water regeneration restored the deactivated sieves substantially to its original rate and improved its capacity. The rate factor is especially important since most contacting processes to separate straight chain hydrocarbons are rate limited. For example in the process disclosed and claimed in U.S. Patent No. 2,985,589 where the circulating flow rate, the rates of introduction of feed and desorbent and the rates of withdrawal of raffinate and sorbate are set to establish the desired flow pattern, changes in the rate of sorption of normal paraffins due to deactivation of the sieves will play havoc with the purity and recovery of the normal paraffins. It is especially important to maintain a high rate sieve in order to efficiently separate the normal paraffins and an effective regeneration procedure must restore the initial rate to the sieve.

Example II

Another sample of the deactivated sieves used in Example I were placed into an uninsulated vessel having a length to diameter ratio of 20. All the sieves had a dark colored appearance at least in part due to the presence of polar contaminants. Saturated steam was passed through one end of the vessel at atmospheric pressure at a low rate for a period of 2 hours and cool liquid water was withdrawn from the other end. The sieves were subsequently examined and shown to contain a top third layer of dark colored sieves, a light colored intermediate third layer and a dark colored bottom third layer. The steam condensed and cooled as it passed through the vessel. These results indicate that the steam being in the vapor phase when first introduced into the vessel is not as effective in regenerating the sieves as hot liquid water since the top third layer of sieves retained its dark color. The results further indicate that hot liquid water regenerates the sieves more rapidly than cooler liquid water since the middle third layer was light in color while the bottom third layer retained its dark color.

Example III

Another sample of the deactivated sieves are tested in a dynamic test apparatus in the following manner. A first mixture of 16% n-tetradecane in isooctane is introduced into one end of a fixed bed thereby contacting a 40 cc. bed of deactivated molecular sieves at 300 p.s.i.g., 232° C. and 3 liquid hourly space velocity (LHSV). When the molecular sieve cavities are full of n-tetradecane as evidenced by a Gas-Liquid Chromatography (GLC) analysis of the effluent from the other end of the fixed bed, a desorbent containing 16% chemically pure n-decane in chemically pure isooctane is introduced into one end of the fixed bed at the above conditions to effect the displacement of n-tetradecane within the sieve cavities by n-decane. This is continued until the effluent contains no n-tetradecane by GLC analysis. The first mixture is thereupon reintroduced into said one end again until the effluent contains no n-decane. The steepness of the concentration gradient for the appearance of n-tetradecane in the effluent is observed and taken as a measure of the rate of sorption of n-tetradecane. Specifically during the latter n-tetradecane displacing of n-decane it was found that 33.4 cc. of first mixture is required to be introduced into said one end in order for the concentration of n-tetradecane in the effluent to go from 1.6% to 14.4% (these concentrations being the 10% point and the 90% point of the concentration of n-tetradecane in the first mixture). The volume of first mixture required to change the effluent from 10% to 90% of n-tetradecane can be taken as a measure of the rate of sorption of n-tetradecane and the higher the volume the slower the rate of sorption. This volume of first mixture for the changing from the 10% point to the 90% point is hereinafter referred to as the breakthrough slope.

Another sample of the deactivated sieves are regenerated with water at 150° C. and 400 p.s.i.g. for 15 hours. These regenerated sieves were then evaluated in the dynamic test apparatus and resulted in a breakthrough slope of 10.1 cc.

Still another sample of the deactivated sieves are regenerated with water at 95° C. and 250 p.s.i.g. for 15 hours. These regenerated sieves are then evaluated in the dynamic test apparatus and results in a breakthrough slope of 10.0 cc.

A fourth sample of the deactivated sieves are treated by contacting the sieves with a wet nitrogen vapor stream at temperatures of 150° C. for a period of 15 hours. These treated sieves show no significant improvement in breakthrough slope over the deactivated sieves.

A fresh batch of the same sieves which were deactivated is evaluated in the dynamic test apparatus and results in a breakthrough slope of 14.4 cc.

These results indicate that liquid water at temperatures below 150° C. will effectively restore the rate of sorption and thereby effectively regenerate molecular sieves.

I claim as my invention:

1. In a process for separating a mixture of hydrocarbons boiling in the kerosene boiling range and comprising a preferentially sorbable hydrocarbon and a non-sorbable hydrocarbon, in which process the hydrocarbon feed mixture is contacted with a molecular sieve sorbent bed capable of selectively retaining in the pores of the sorbent a straight chain hydrocarbon in said mixture and of rejecting branched chain and cyclic compounds, and the sorbed straight chain hydrocarbon is displaced from the sorbent by a hydrocarbon desorbent, the method which comprises continuing said contacting and displacement until the sorbent has become deactivated by retention therein of a high molecular weight polar organic contaminant of greater sorptiveness than the preferentially sorbed hydrocarbon of said feed mixture, removing the sorbed straight chain hydocarbon from the thus deactivated sobent, thereafter regenerating the sorbent by passing through the deactivated sorbent a stream consisting essentially of water at a temperature below about 150° C. and a pressure to maintain the water in the liquid phase and a liquid hourly space velocity of from about 0.05 to about 2.0, continuing the passage of water through the bed for a period of at least about 12 hours and until the sieves are substantially freed of said contaminant and thereby reactivated, and then removing the water from the reactivated sieves.

2. The process of claim 1 further characterized in that the liquid water is introduced upflow into contact with the deactivated sorbent bed.

3. The process of claim 1 further characterized in that the temperature in the bed is maintained from about 60° C. to about 150° C. during the entire time in which the liquid water is passing through the bed.

4. The process of claim 1 further characterized in that the sorbent is a metallic alumino-silicate containing pore entrances of from about 4 to about 6 Angstrom units in cross sectional diameter.

5. The process of claim 4 further characterized in that the sorbent is a Type A calcium alumino-silicate molecular sieve.

6. Process for regenerating a molecular sieve sorbent which has become deactivated by retention therein of a polynuclear polar organic contaminant containing nitrogen, oxygen or sulfur and having a molecular weight of from about 150 to about 700 which comprises contacting the deactivated sorbent with a liquid regenerant consisting essentially of water at a temperature below about 150° C. and a pressure to maintain the water in the liquid phase and a liquid hourly space velocity of from about 0.05 to about 2.0, continuing said contacting step for a period of at least about 12 hours and until the sorbent is substantially freed of said contaminant and thereby reactivated, and then removing the water from the reactivated sorbent.

7. The process of claim 6 further characterized in that the temperature of the sorbent is maintained from about 60° C. to about 150° C. during said contacting step.

8. The process of claim 6 further characterized in that said molecular sieve sorbent is an alkali metal or alkaline earth metal alumino-silicate having a pore entrance diameter of less than about 6 A.

9. The process of claim 6 further characterized in that said molecular sieve sorbent is a Type A calcium alumino-silicate molecular sieve.

10. Process for regenerating a molecular sieve sorbent which has become deactivated by retention therein of a polar organic contaminant containing nitrogen, oxygen or sulfur which comprises contacting the deactivated sorbent with a liquid regenerant consisting essentially of water at a temperature of from about 60° C. to about 150° C. and a pressure to maintain the water in the liquid phase and a liquid hourly space velocity of from about 0.05 to about 2.0, continuing said contacting step for a period of at least about 12 hours and until the sorbent is substantially freed of said contaminant and thereby reactivated, and then removing the water from the reactivated sorbent.

11. In a process for separating a mixture of hydrocarbons boiling in the kerosene boiling range and comprising a preferentially sorbable hydrocarbon and a non-sorbable hydrocarbon, in which process the hydrocarbon feed mixture is contacted with a molecular sieve sorbent bed capable of selectively retaining in the pores of the sorbent a straight chain hydrocarbon in said mixture and of rejecting branched chain and cyclic compounds, and the sorbed straight chain hydrocarbon is displaced from the sorbent by a hydrocarbon desorbent, the method which comprises continuing said contacting and displacement until the sorbent has become deactivated by retention therein of a high molecular weight polar organic contaminant of greater sorptiveness than the preferentially sorbed hydrocarbon of said feed mixture, removing the sorbed straight chain hydrocarbon from the thus deactivated sobent, thereafter regenerating the sorbent by passing through the deactivated sorbent a stream consisting essentially of water at a temperature below about 150° C. and a pressure to maintain the water in the liquid phase, continuing the passage of water through the bed until the sieves are substantially freed of said contaminant and thereby reactivated, and then removing the water from the reactivated sieves.

References Cited

UNITED STATES PATENTS

| | | | |
|---|---|---|---|
| 2,818,449 | 12/1957 | Christensen et al. | 208—310 |
| 2,886,508 | 5/1959 | Hess et al. | 260—676 |
| 2,886,509 | 5/1959 | Christensen et al. | 208—310 |
| 2,894,998 | 7/1959 | Hess et al. | 260—676 |
| 2,988,577 | 6/1961 | Sensel | 260—676 |
| 3,094,569 | 6/1963 | Thomas | 260—676 |
| 3,075,023 | 1/1963 | Garrison et al. | 208—310 |

DELBERT E. GANTZ, *Primary Examiner.*

H. LEVINE, *Assistant Examiner.*

U.S. Cl. X.R.

252—420; 260—676